Nov. 4, 1952 — G. WESTOVER — 2,616,330
APPARATUS FOR PHOTOGRAPHICALLY COMPOSING TEXT MATTER
Filed Aug. 6, 1947 — 19 Sheets-Sheet 2.
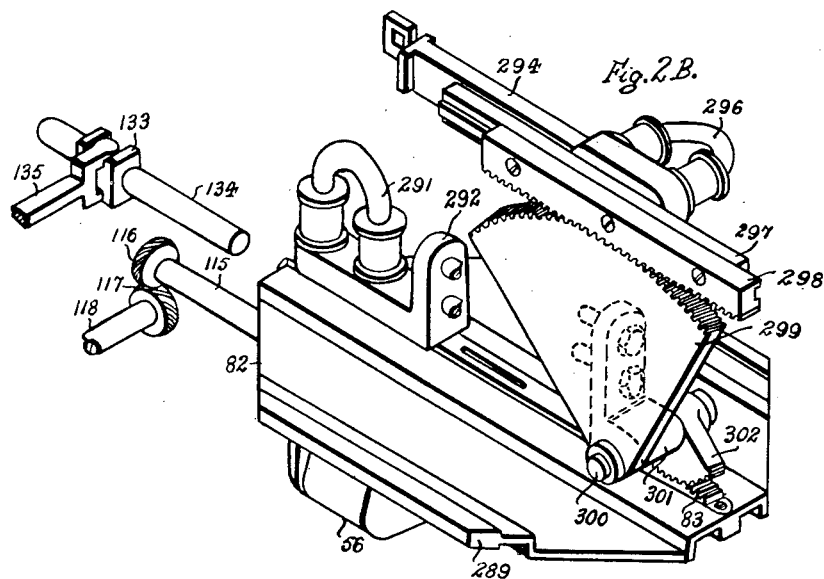
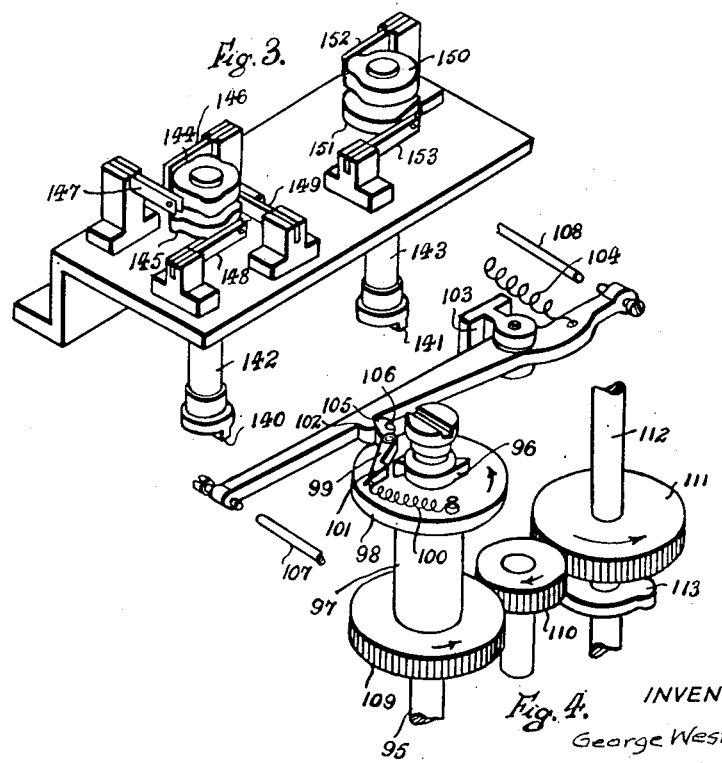
INVENTOR
George Westover
BY
Richardson, David and Norden
his ATTORNEYS.

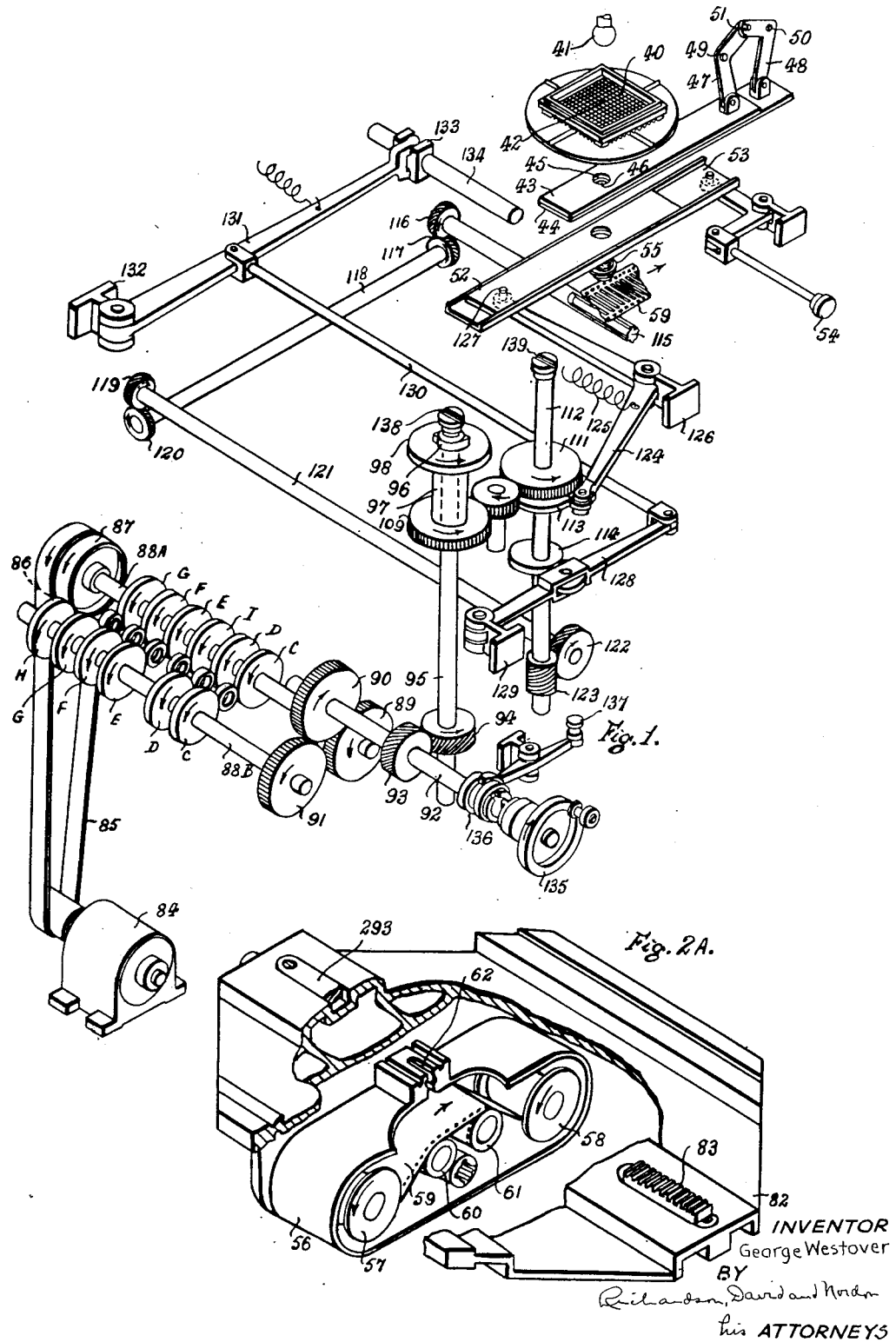

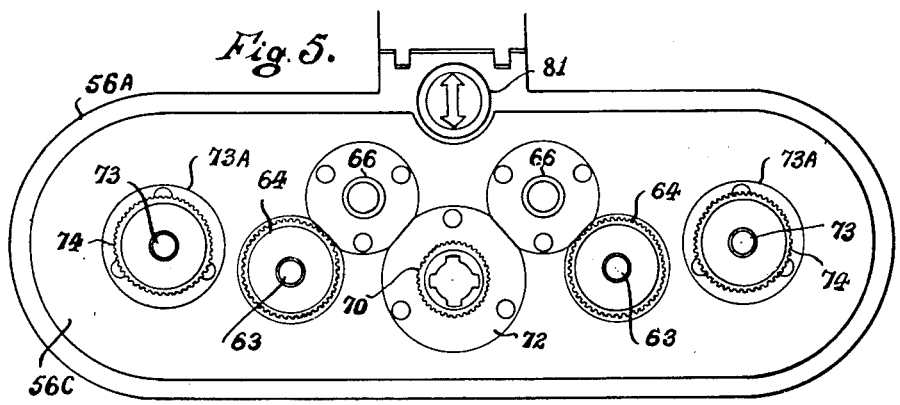
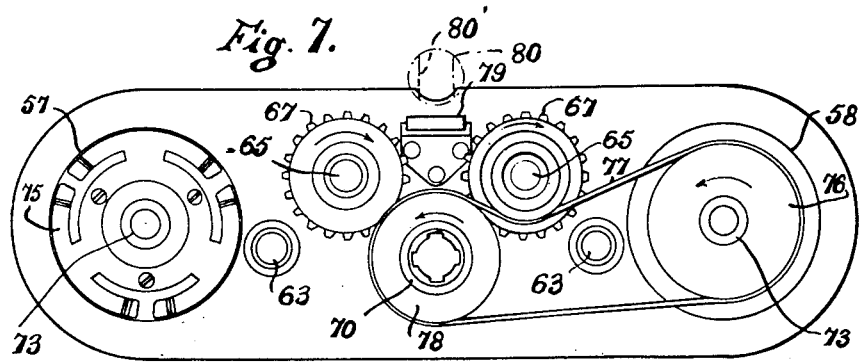
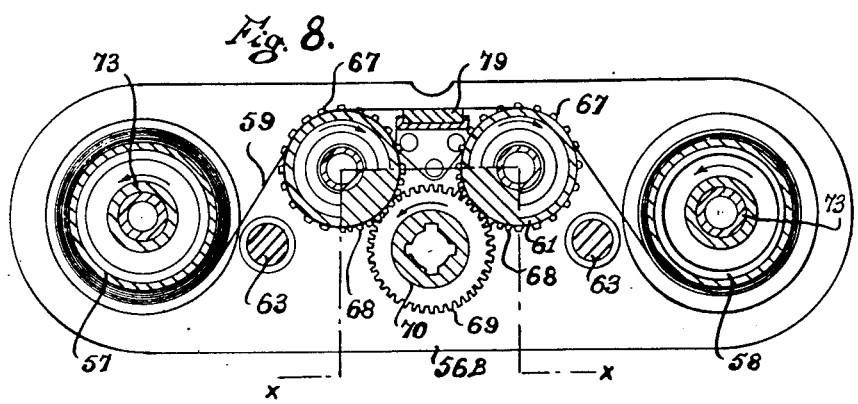

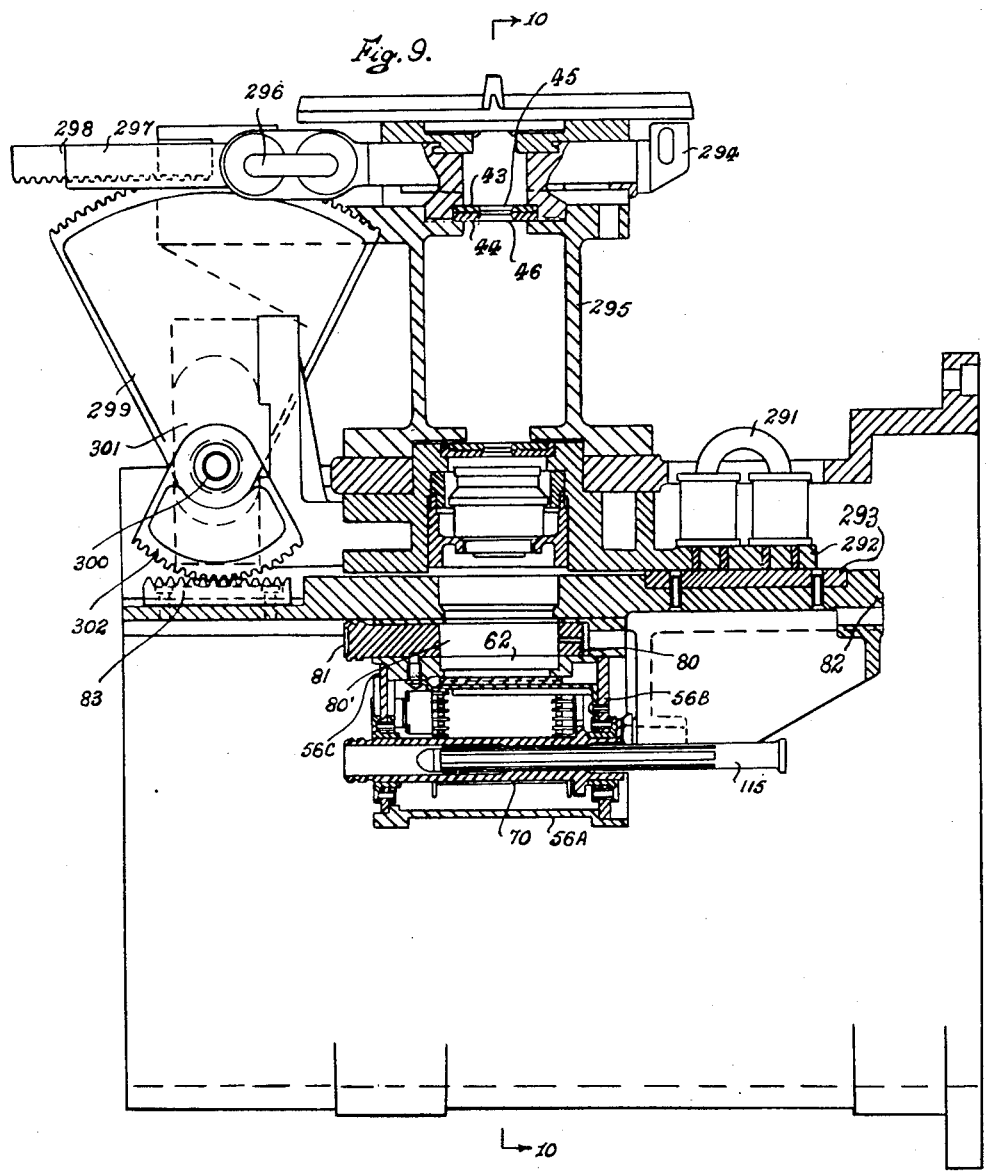

Nov. 4, 1952            G. WESTOVER            2,616,330
APPARATUS FOR PHOTOGRAPHICALLY COMPOSING TEXT MATTER
Filed Aug. 6, 1947            19 Sheets-Sheet 6
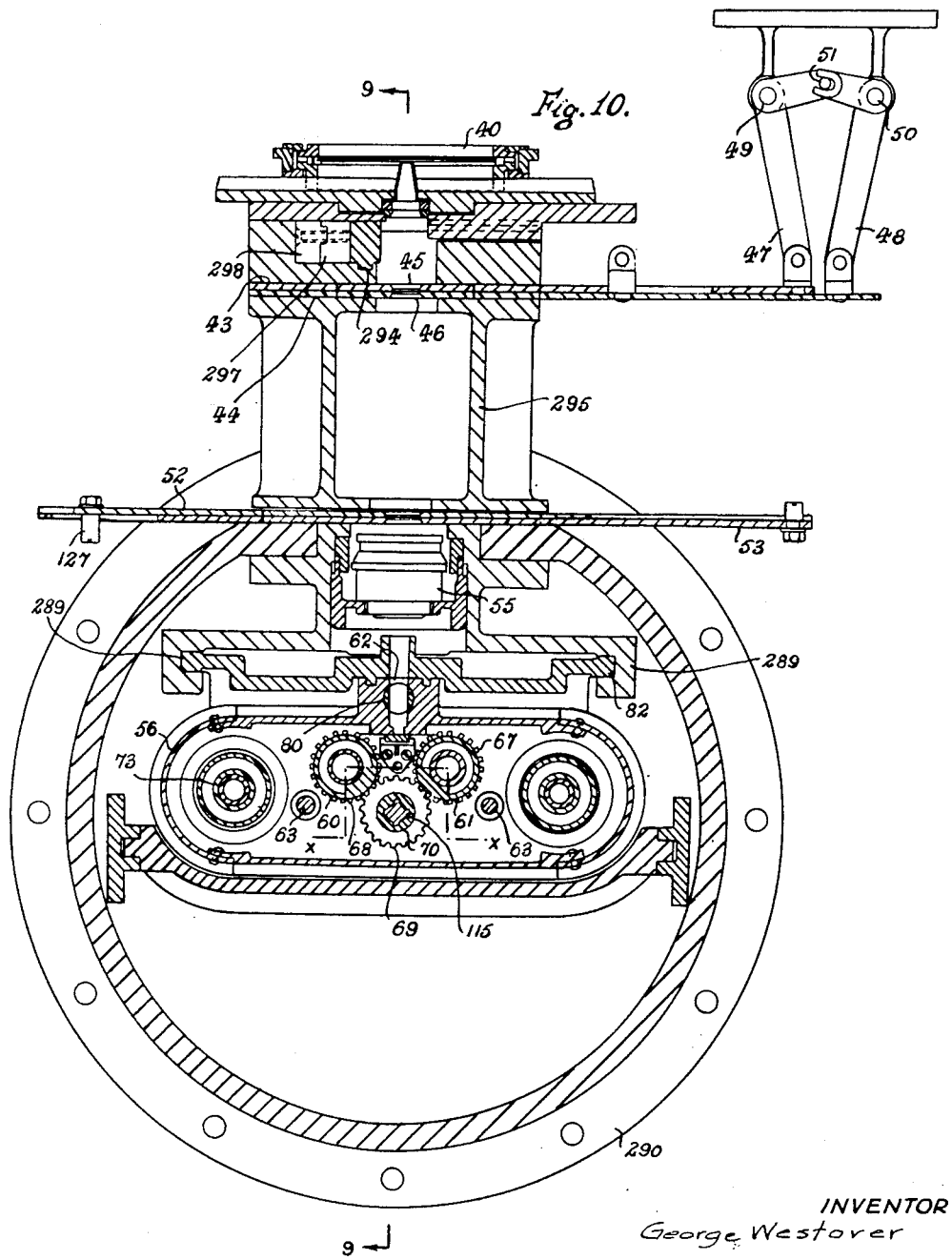
INVENTOR
George Westover
BY
Richardson, Davis and Nordin
his ATTORNEYS

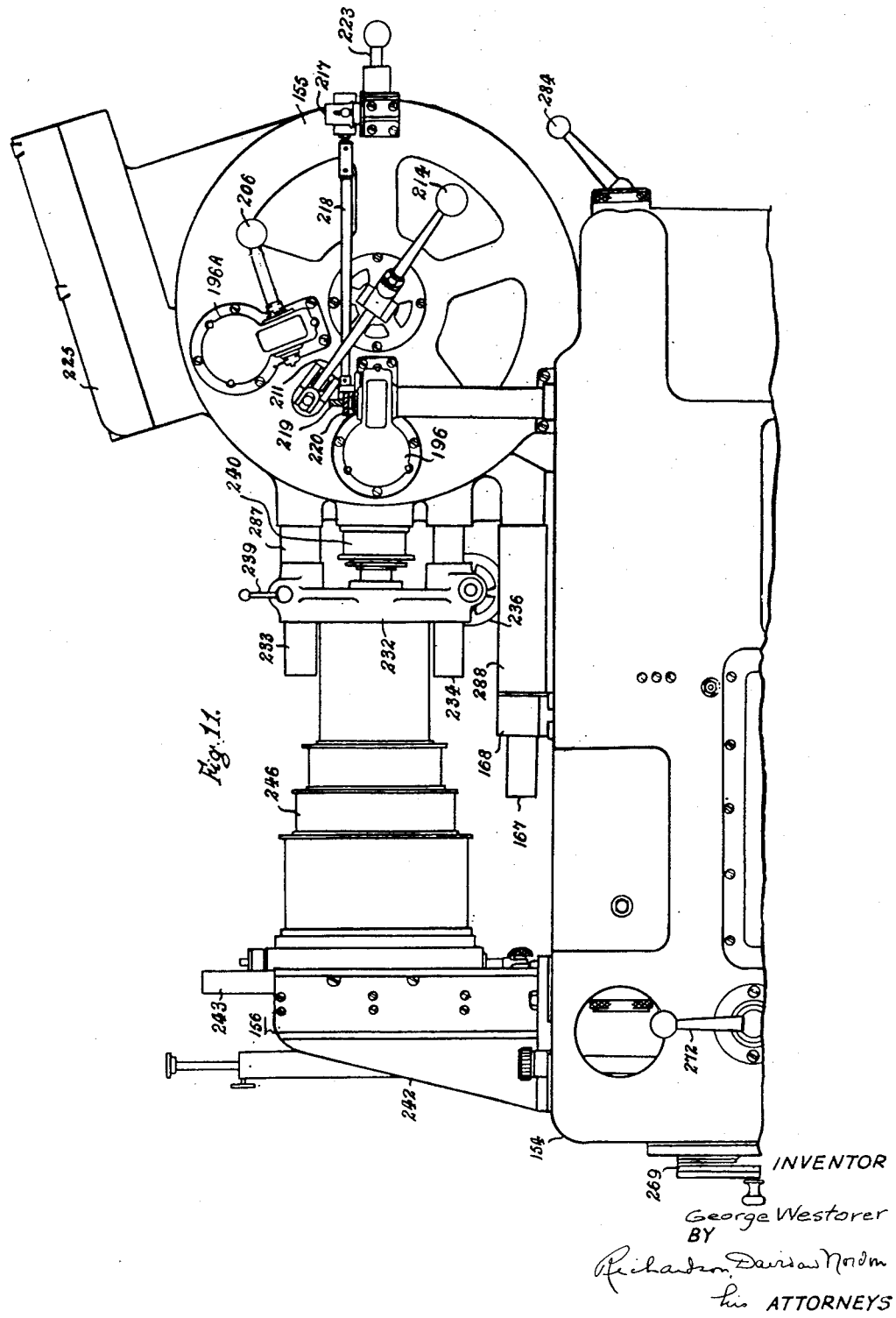

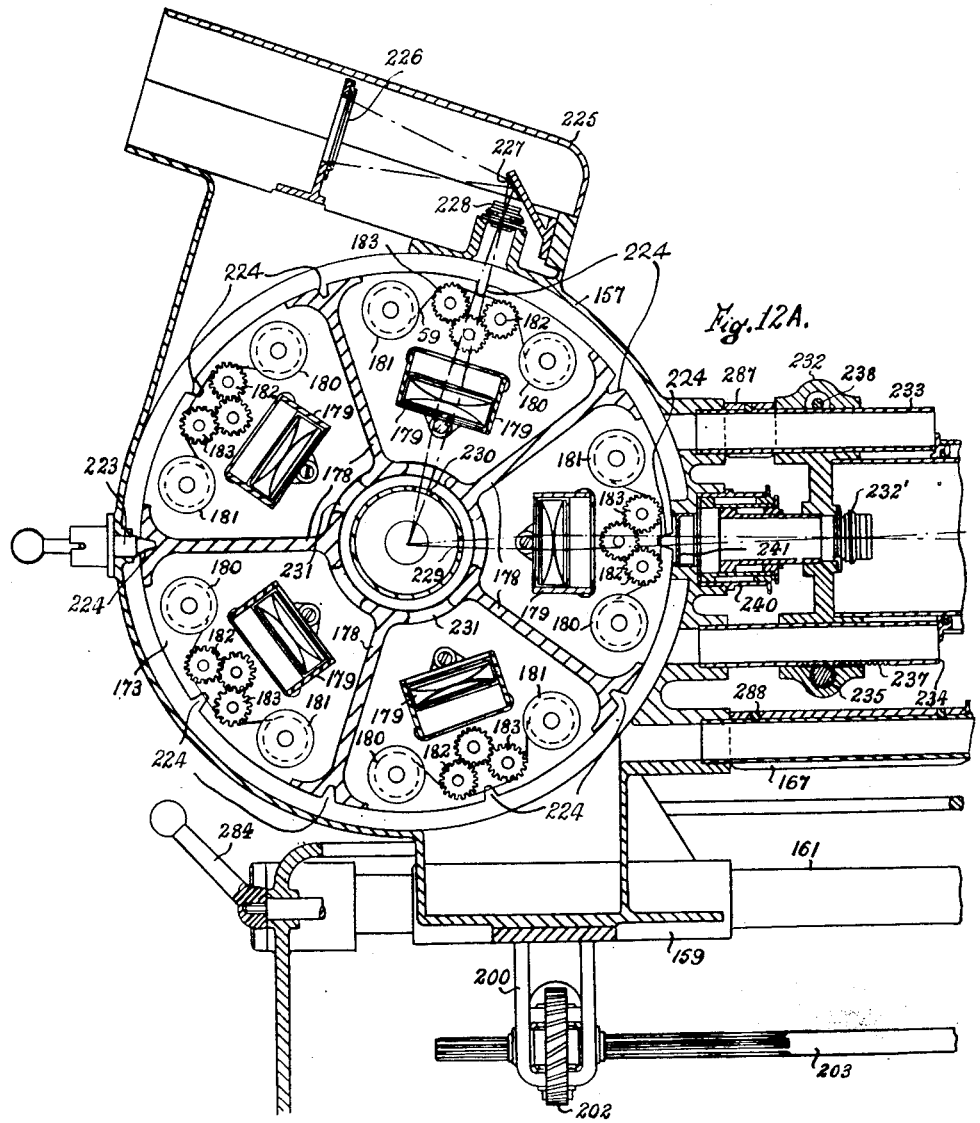

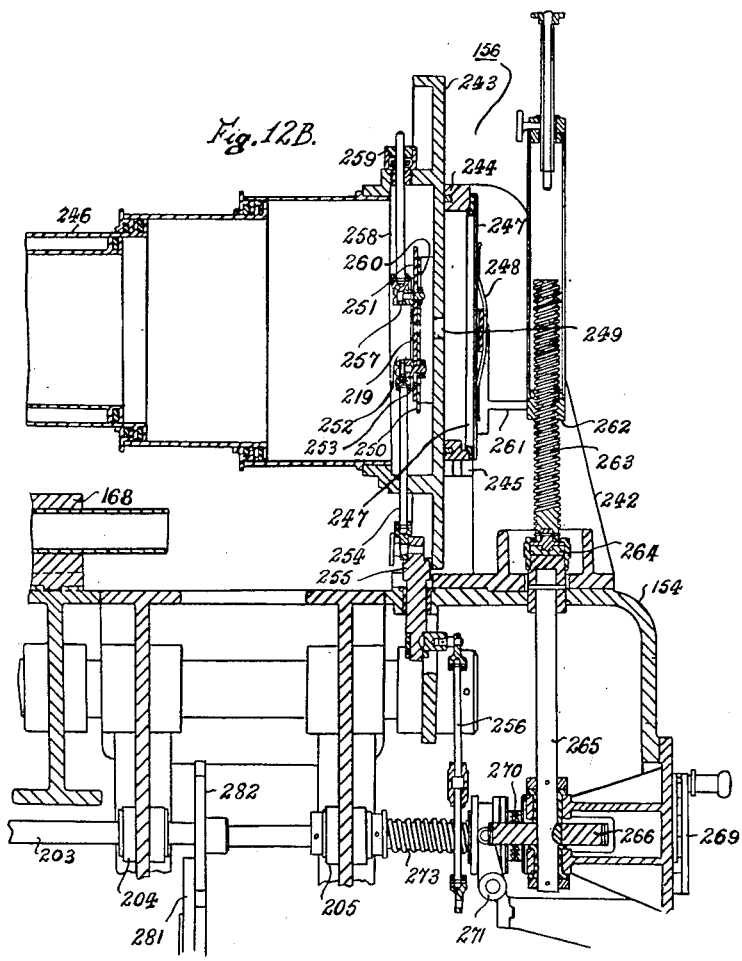

Nov. 4, 1952 G. WESTOVER 2,616,330
APPARATUS FOR PHOTOGRAPHICALLY COMPOSING TEXT MATTER
Filed Aug. 6, 1947 19 Sheets-Sheet 11

INVENTOR
George Westover
BY
Richardson, Davies and Norton
his ATTORNEYS

Nov. 4, 1952 G. WESTOVER 2,616,330
APPARATUS FOR PHOTOGRAPHICALLY COMPOSING TEXT MATTER
Filed Aug. 6, 1947 19 Sheets-Sheet 12
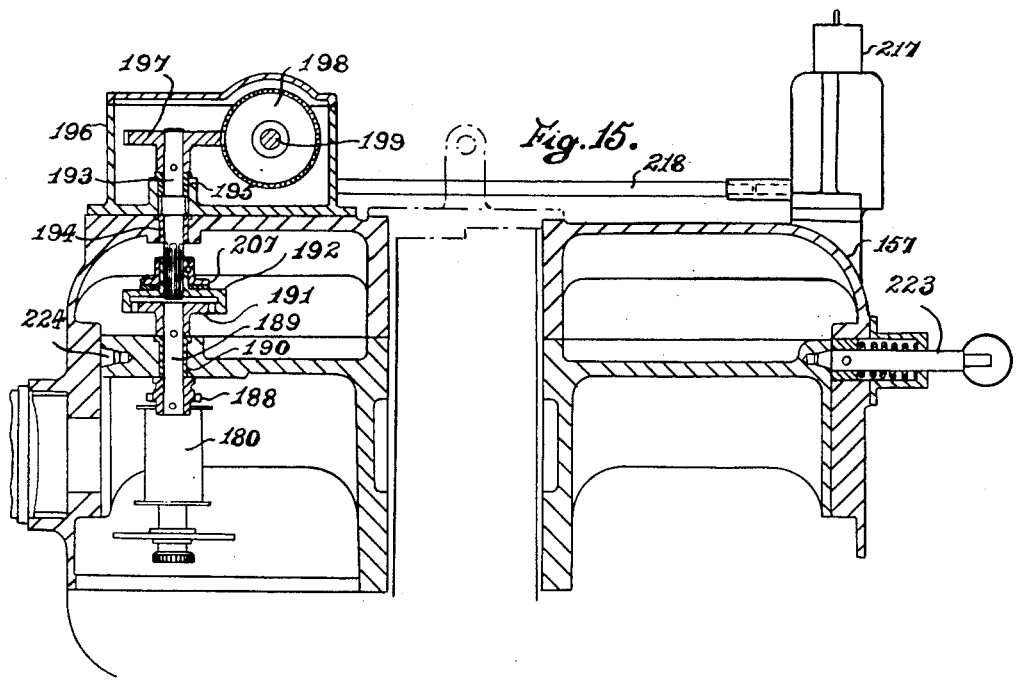
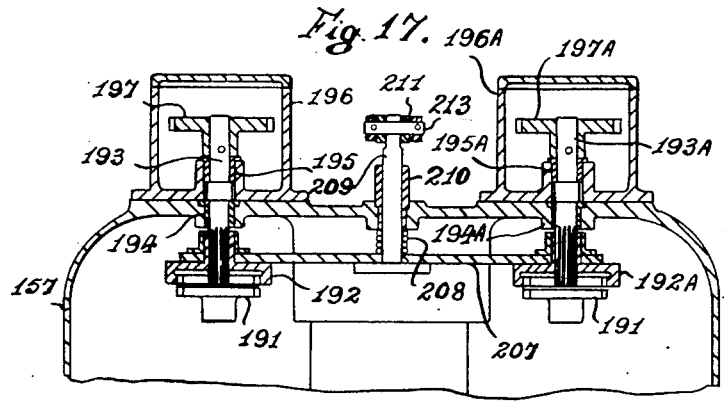
INVENTOR
George Westover
BY
Richardson, Davidson Morden
his ATTORNEYS Nov. 4, 1952 G. WESTOVER 2,616,330
APPARATUS FOR PHOTOGRAPHICALLY COMPOSING TEXT MATTER
Filed Aug. 6, 1947 19 Sheets-Sheet 13
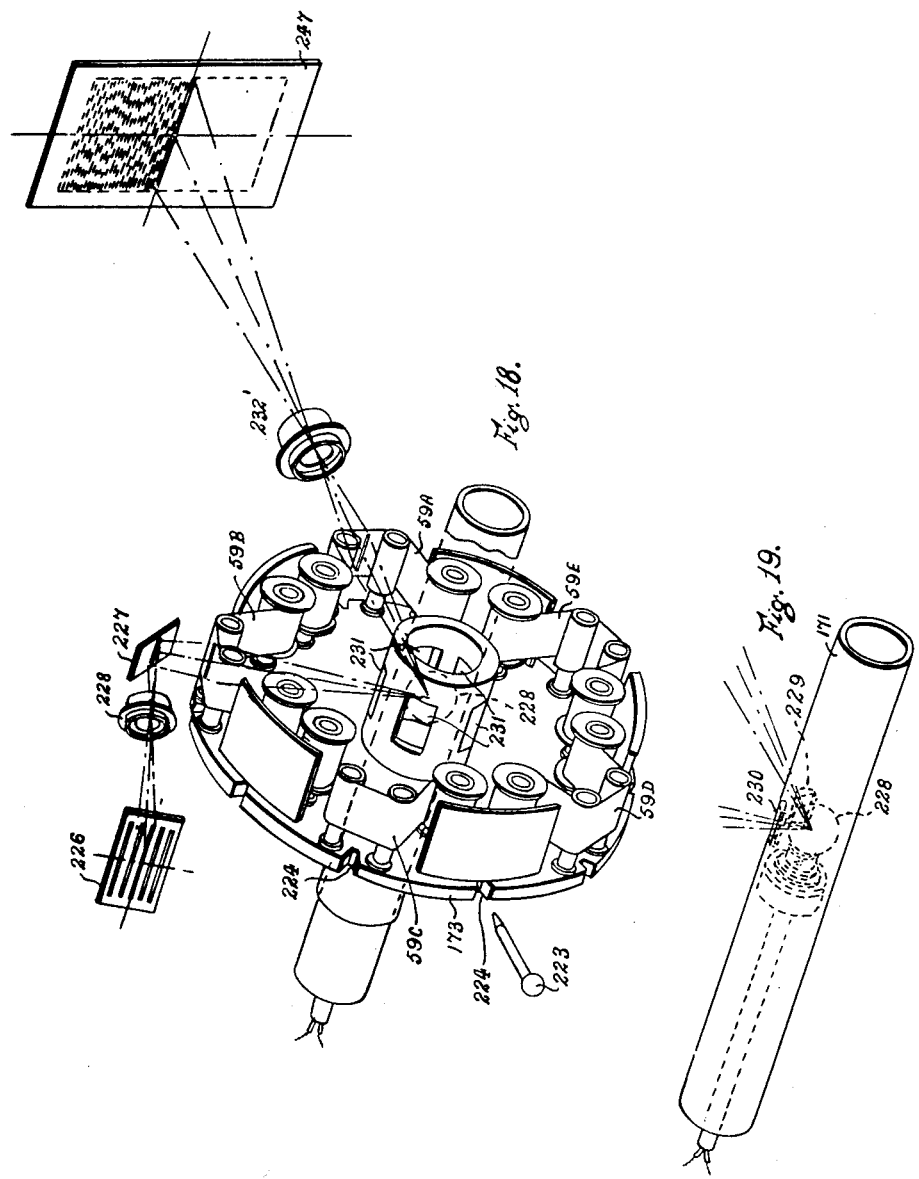
INVENTOR
George Westover
BY
Richardson, David and Norden
his ATTORNEYS Nov. 4, 1952 G. WESTOVER 2,616,330
APPARATUS FOR PHOTOGRAPHICALLY COMPOSING TEXT MATTER
Filed Aug. 6, 1947 19 Sheets-Sheet 14
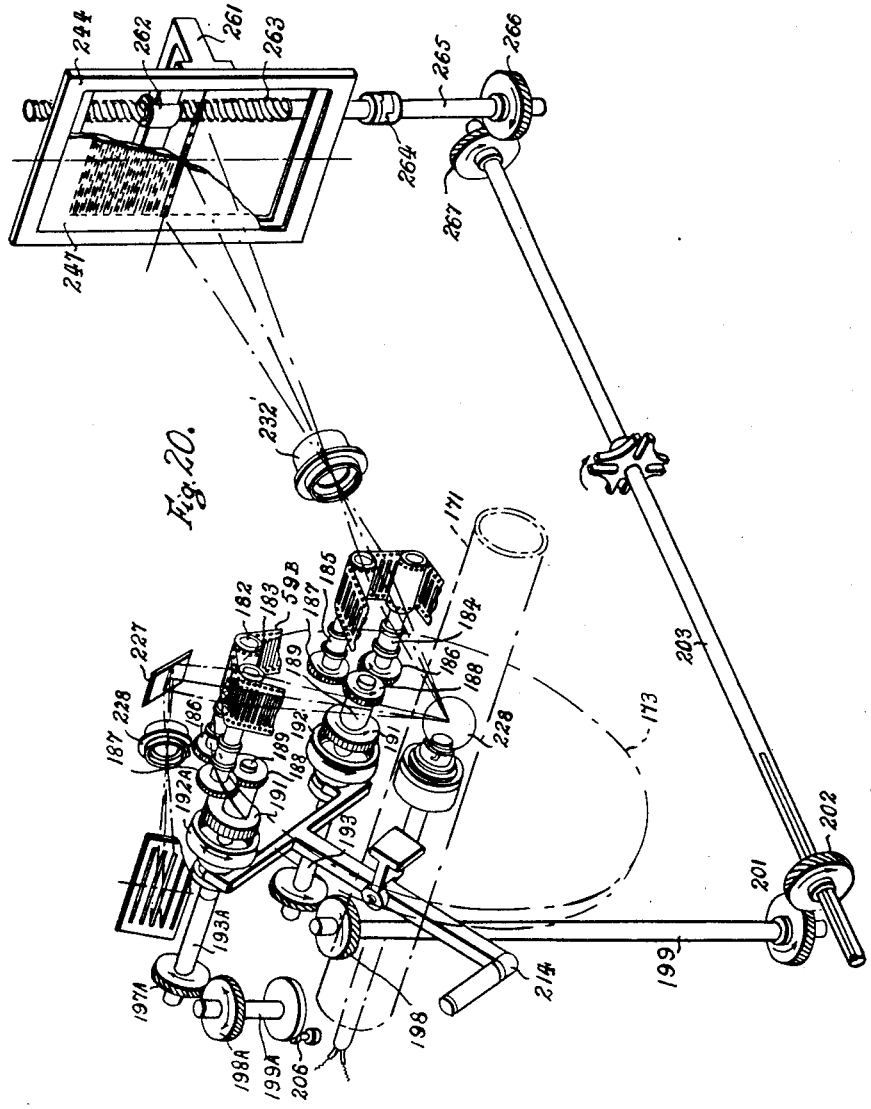
INVENTOR
George Westorer
BY Richardson, Davidson Nordon
his ATTORNEYS.

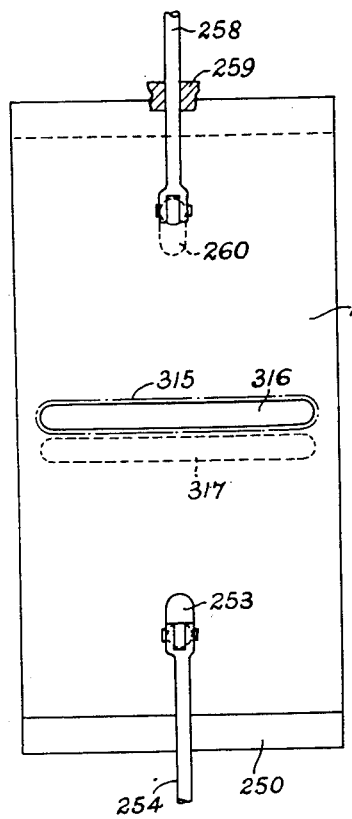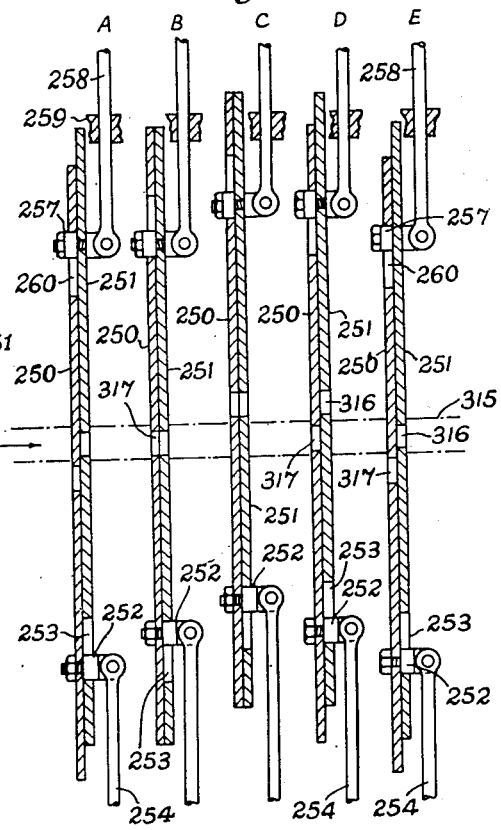

Nov. 4, 1952            G. WESTOVER            2,616,330
APPARATUS FOR PHOTOGRAPHICALLY COMPOSING TEXT MATTER
Filed Aug. 6, 1947            19 Sheets—Sheet 16
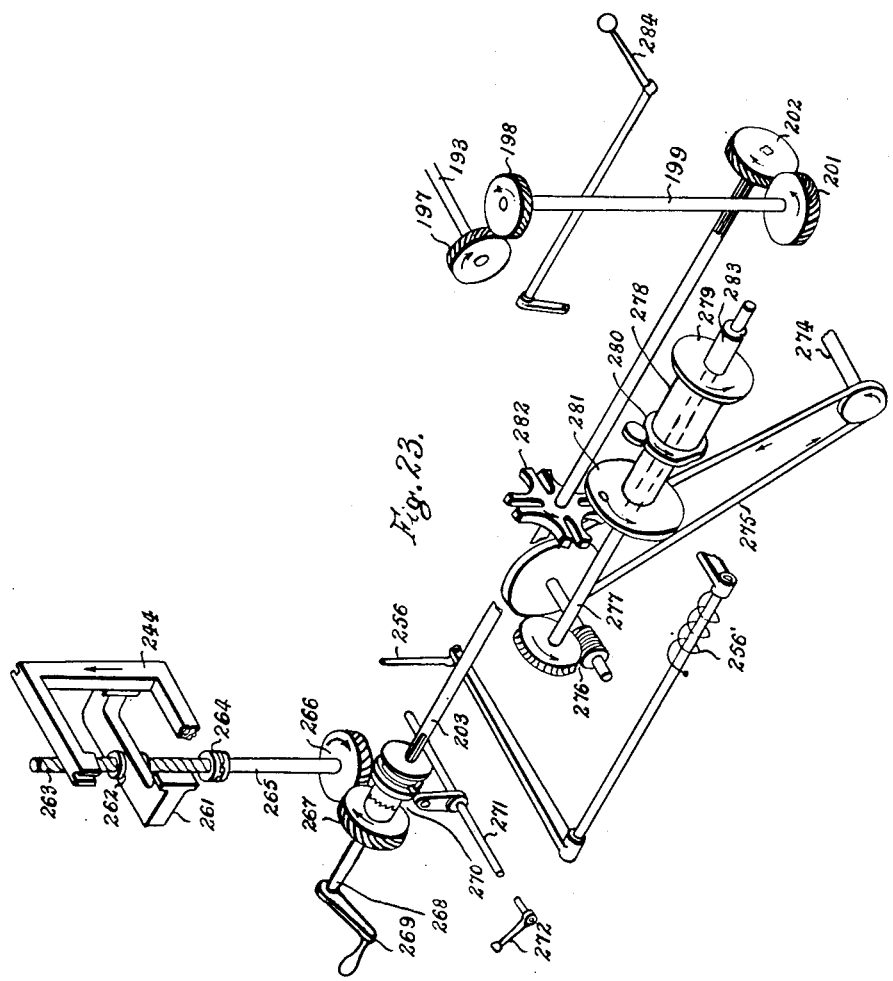
INVENTOR
George Westover
BY
*his* ATTORNEYS.

Nov. 4, 1952  G. WESTOVER  2,616,330
APPARATUS FOR PHOTOGRAPHICALLY COMPOSING TEXT MATTER
Filed Aug. 6, 1947  19 Sheets-Sheet 17
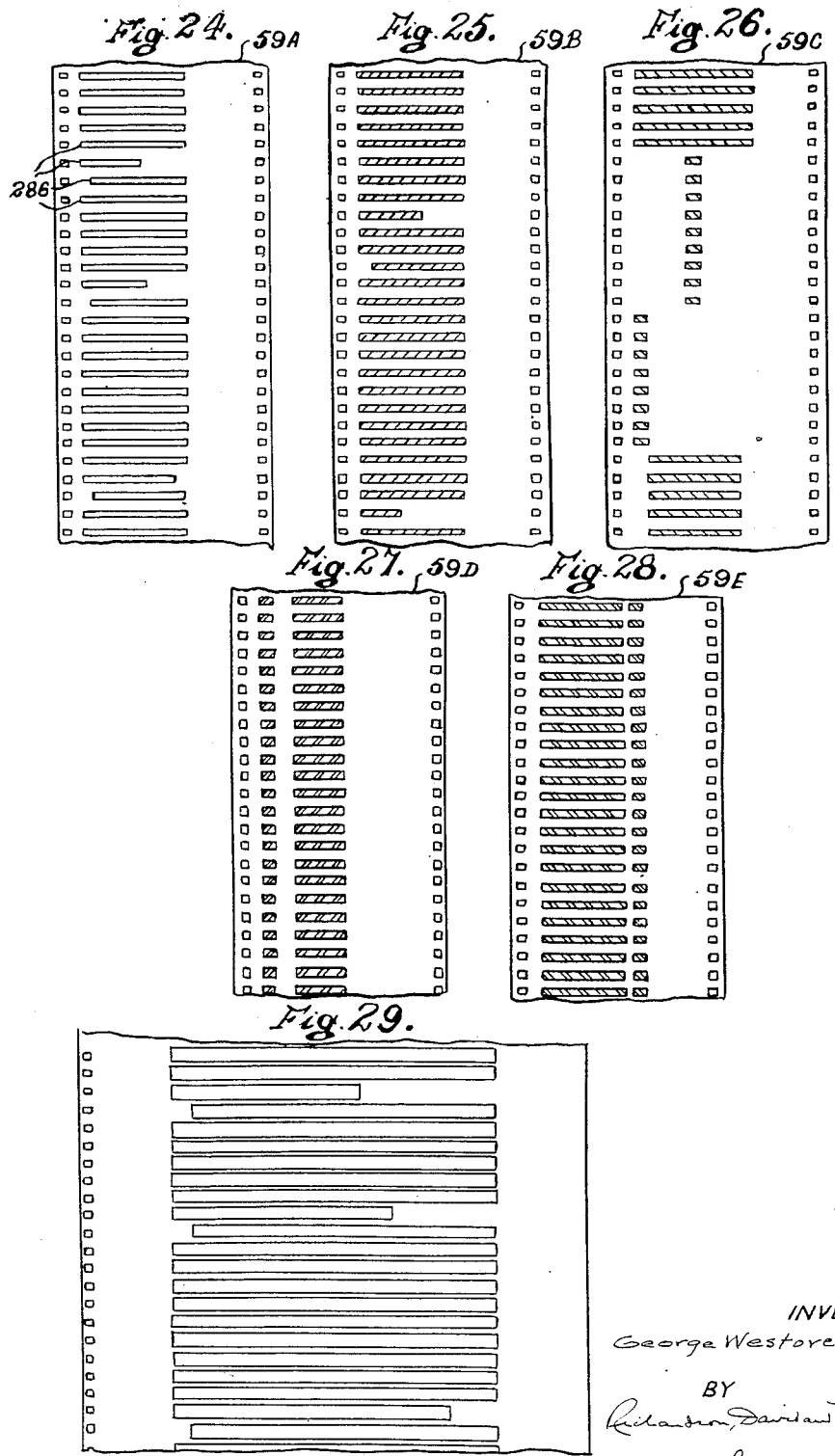
INVENTOR
George Westover
BY
Richardson, Davidson Hordan
his ATTORNEYS

Fig. 30.

KEY-PROOF        PAGE 196

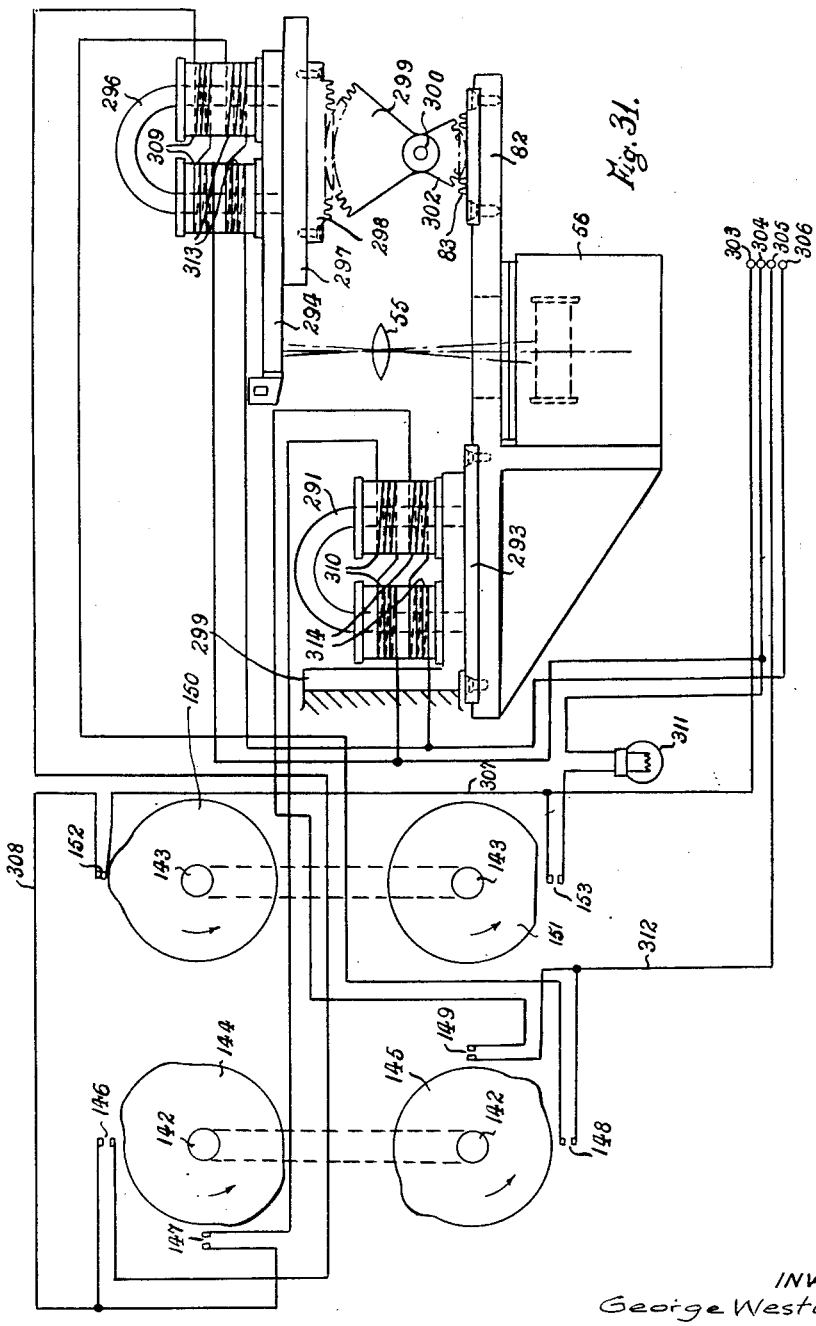

UNITED STATES PATENT OFFICE 2,616,330

APPARATUS FOR PHOTOGRAPHICALLY COMPOSING TEXT MATTER

George Westover, London, England

Application August 6, 1947, Serial No. 766,733
In Great Britain August 8, 1946

5 Claims. (Cl. 88—24)

This invention relates to an apparatus for photographically composing original characters into justified lines of text matter and for photographically composing such lines into page form. The invention furthermore relates to an apparatus of the kind wherein the selection for exposure of the individual characters from a master plate, and the movements of the carrier on which the lines of text matter are composed, are controlled by a previously prepared record-strip, such as is employed for controlling type-casting and composing machines.

Objects of this invention are to facilitate proof correction and making up, to provide a convenient and economical form of photo-sensitised line carrier, to enable lines to be composed, if desired, which read from right to left, and to provide a robust and relatively compact apparatus for carrying out the improved method.

According to this invention, a method of photographically composing a page form consists in preparing a first image carrier strip (hereinafter termed the "line strip") bearing justified lines of characters disposed transversely of the strip at uniform spacing and constituting uncorrected text, preparing a second image carrier strip (hereinafter termed the "correction strip") bearing justified lines of characters disposed transversely of the strip and constituting lines of corrected text required to be substituted in the uncorrected text, feeding the line strip longitudinally and intermittently through uniform steps equal to the line intervals thereon so as to bring lines thereon not requiring correction in succession into a projection station, after each such feeding step optically projecting the complete line in the said station onto an exposure station, feeding the correction strip longitudinally and intermittently through uniform steps equal to the line intervals thereon so as to bring corrected lines, when required, and in succession, into a projection station, after each such feeding step optically projecting the complete corrected line in the last-mentioned station onto the said exposure station, feeding parts of the line strip bearing incorrect lines through a projection station without projecting such lines, and in each interval between any two succeeding projections from either of said strips feeding a photo-sensitive page carrier through a uniform interval past said exposure station. A common projection station may be employed for both the line strip and the correction strip, the two strips together with their feeding means being displaced simultaneously, in any interval between two successive projections from the two strips respectively, so as to bring the line required to be projected to the common projection station.

One or more additional image carrier strips may be prepared, bearing for example page numbers and page headlines, chapter headlines or other sundries, and lines from these may be interposed in the page form by projecting one or more lines onto the page carrier from such an additional strip instead of from the line strip or the correction strip in any interval or group of intervals between feeding steps of the page carrier, the feeding of the line strip being meanwhile interrupted.

According to a further feature of this invention, a method, of the kind hereinbefore set forth, of photographically composing text matter in justified lines under control of said record-strip includes the steps of positioning said master plate so as to bring selected characters successively into a projection station and projecting the characters so selected in succession along a line lying transversely of a photo-sensitive line strip to compose a justified line of characters, preferably to a reduced scale, thereafter feeding said line strip through a uniform interval which is longer in proportion than the intended spacing of the lines when composed in page form, and repeating the foregoing steps. The line strip may be provided with perforations adapted to co-operate with driving means, the pitch of the lines of characters composed on the line strip being equal to the pitch of these perforations.

The projection of characters from the master plate to the line strip is preferably effected by a stationary optical system, the line strip being moved transversely of its length, under control of the record-strip, before (or after) each such projection, through a distance dependent on the width of the character next to be (or last) projected, until a line has been composed, whereupon the strip is moved back transversely and fed longitudinally in readiness to receive the image of the first character to be projected of the next succeeding line.

Lines or successions of lines requiring correction as a consequence of proof reading of the text on the line strip are photographically composed in corrected form on the correction strip, by the same method as was employed for the composition of the line strip, and a page key proof is made by cutting and patching together proofs made from the line strip and the correction strip, preferably by projection to an enlarged scale, with the interposition, if desired, of page numbers and page headlines and other sundries, this composite page key proof serving as the key by which the operator carries out the photographic composition of the final page form. Since the spacing of the lines on these proofs of the line and correction strips can be longer in proportion than the intended spacing of the lines when composed in page form, the proofs of the strips can easily be cut for the purpose of making the composite key proof without risk of cutting off ascenders and descenders.

As, however, the page key proofs are only required to serve as a guide to the operator in carrying out the photographic composition of the final page form, any accidental cutting off of ascenders and descenders would be a matter of little importance.

According to a further feature of the invention, the master plate is a transparent negative, and the line and correction strips, which are also transparent, are exposed to light transmitted through the negative and are subsequently processed in known manner to effect a reversal so that the character images thereon are also negative. This yields a positive page form by simple projection of the line and correction strips onto a photo-sensitised page carrier.

According to yet another feature of the invention, in the aforesaid method of photographically composing a page form from the said line strip and correction strip, the photo-sensitive page carrier is fed, in each interval between any two succeeding projections from either strip, through a uniform interval which is shorter in proportion than the line intervals on the line strip.

Apparatus according to this invention for photographically composing a page form from two or more image-carrier strips each bearing characters arranged in justified lines disposed transversely of the strip, by selecting single lines or successions of lines alternately from the several strips, includes feeding means adapted to feed the several strips intermittently, independently of one another and line by line, feeding means adapted to feed a photo-sensitive page carrier intermittently through uniform but variable steps, an optical system including exposing means, such as a shutter or an intermittently operative light source, for projecting an image of a line of characters on any of said strips onto the page carrier, and control means operable for selecting said strips alternatively for such projection of lines thereon. The image carrier strips are preferably films perforated for feeding in known manner by means of sprockets, and two or more film-feeding devices, each including at least one sprocket and mountings for a take-up spool and a trailing spool, may be spaced from one another on a common support for co-operation with a common optical system. Preferably the several feeding devices are distributed around the support which has the form of an indexing head rotatable by selecting control means to bring the several films one at a time into a common projection station. Alternatively the several feeding devices may be distributed around a fixed head, the optical system including an optical element rotatable by the selecting control means for selecting the several films one at a time for projection.

A preferred form of apparatus in accordance with the invention will be described by way of example, and with reference to the accompanying drawings, in which:

Figure 1 is a diagrammatic view of the main moving parts of apparatus for photographically composing a line strip from a transparent master plate.

Figures 2A, 2B, 3 and 4 show other parts of the same apparatus, which do not appear in Figure 1; Figure 2A shows a camera and its carriage, both partly broken away; Figure 2B corresponds to Figure 2A, but shows the complete camera and carriage with its actuating mechanism, Figure 3 an electrical circuit breaker assembly, and Figure 4 a trip clutch.

Figure 5 is an elevation of the camera shown diagrammatically in Figure 2A.

Figure 7 is an elevation of the parts appearing in Figure 6, but without a film in position.

Figure 8 is a section taken generally on the line 8—8 in Figure 6, the portion under the line X—X being sectioned on the line X—X in Figure 6.

Figure 9 is an elevation of the camera and carriage, partly in section, on the line 9—9 in Figure 10.

Figure 10 is a section of the camera and carriage taken on the line 10—10 in Figure 9.

Figure 11 is a side elevation of apparatus for photographically composing a page form from several line strips.

Figures 12A and 12B together form a longitudinal section of part of the apparatus shown in Figure 11.

Figure 13:
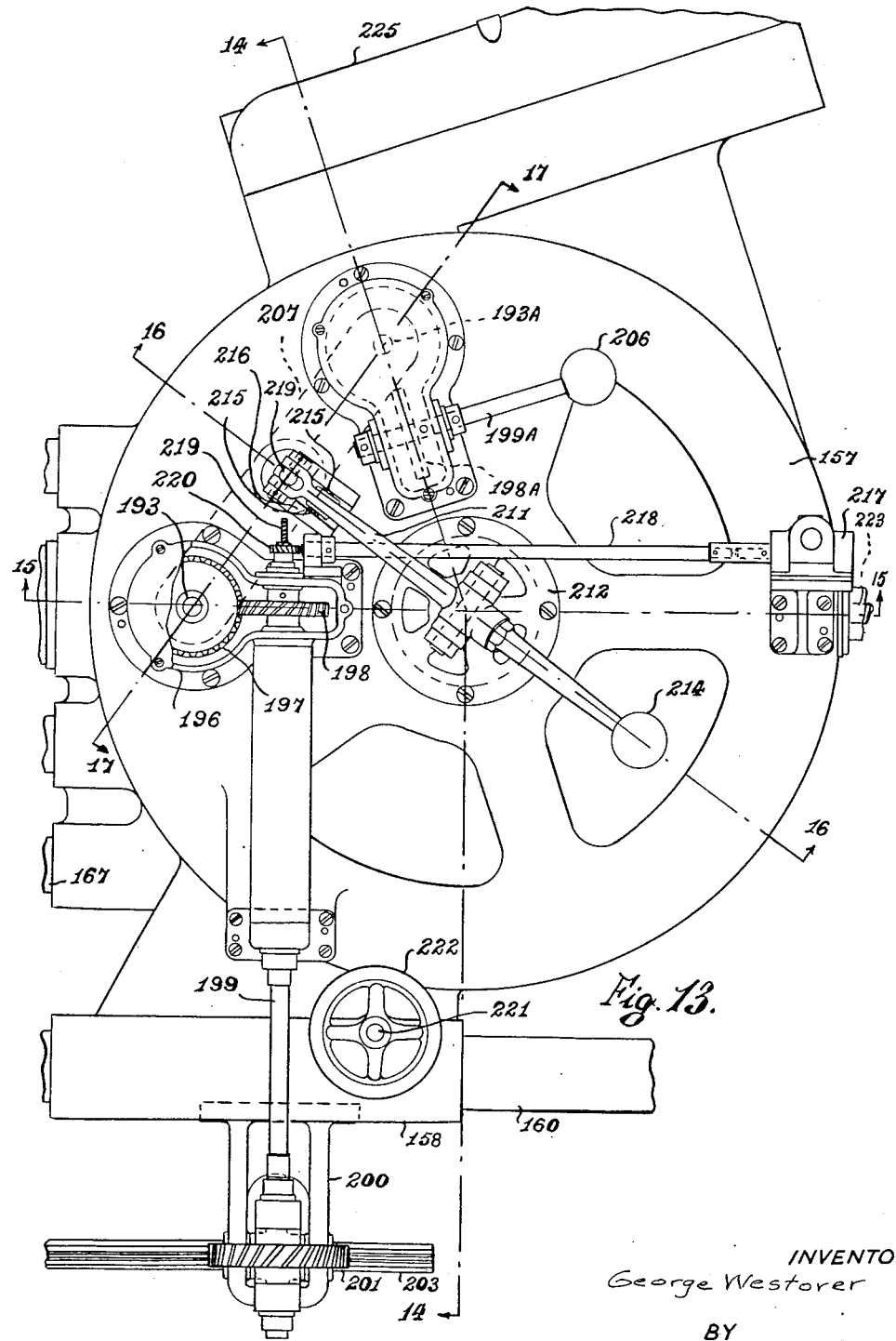

Figure 13 is a side elevation of part of the apparatus shown in Figure 11, to a larger scale.

Figure 14:
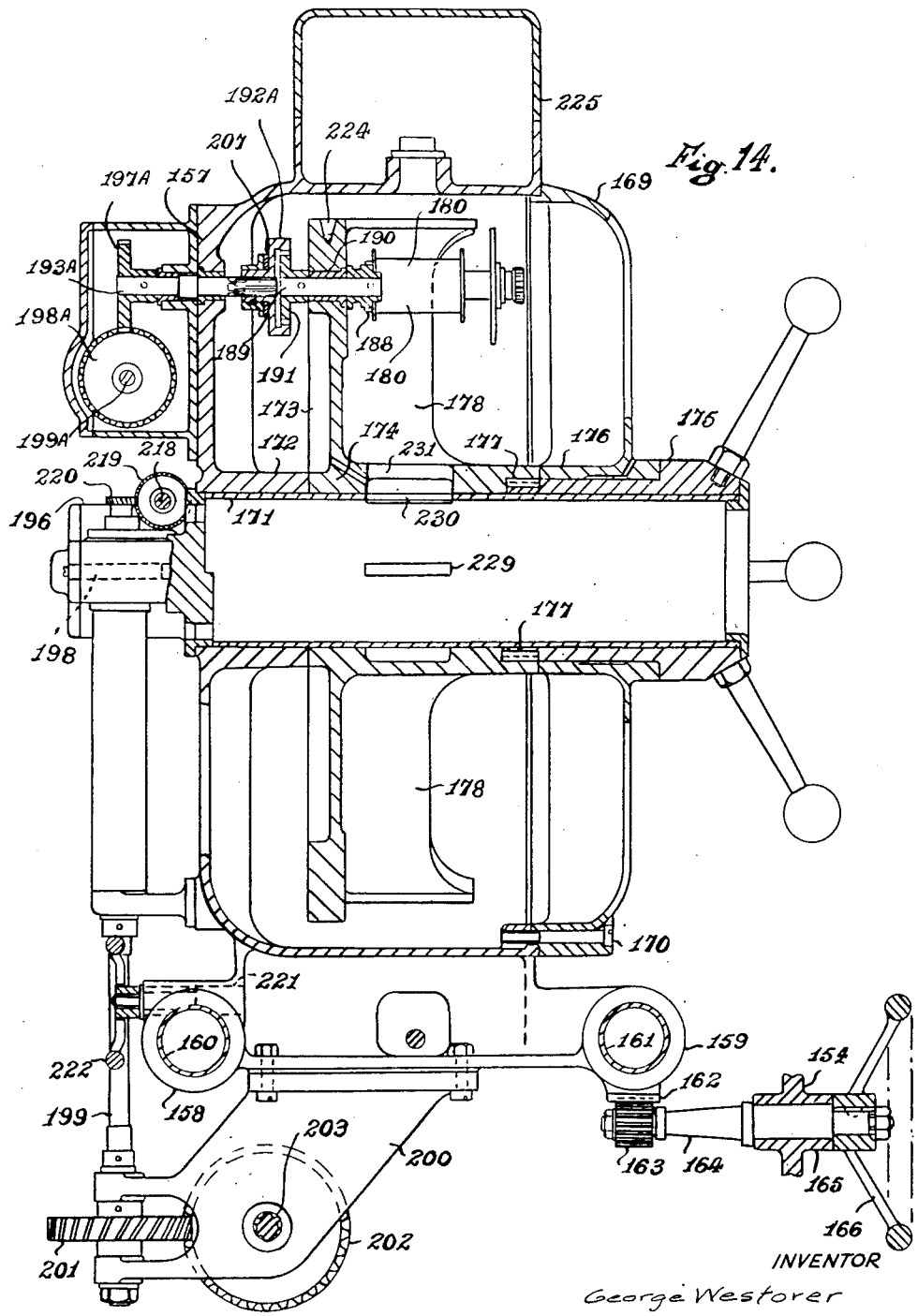

Figure 14 is a section of this part, largely on the line 14—14 in Figure 13.

Figure 15 is a section on the line 15—15 in Figure 13.

Figure 16:
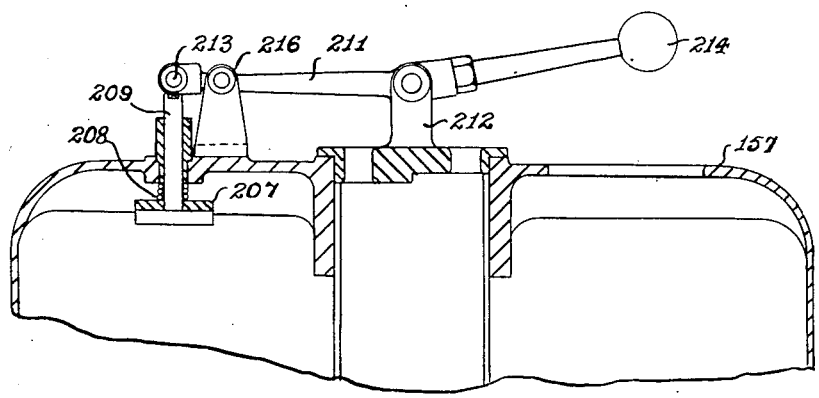

Figure 16 is a local section on the line 16—16 in Figure 13.

Figure 17 is a local section on the line 17—17 in Fig. 13.

Figure 18 is a diagram of the optical system of the apparatus shown in Figures 11 to 17.

Figure 19 is a diagram of a lamp appearing in Figure 18.

Figure 20 is a diagram corresponding to Figure 18, but showing driving mechanism.

Figure 21 is a diagrammatic elevation of a shutter in the apparatus shown in Figures 11 to 20.

Figures 22A–22E are diagrammatic sections of the shutter shown in Figure 21, in different positions respectively.

Figure 23 is a diagram of driving mechanism of the apparatus shown in Figures 11 to 22.

Figures 24 to 28 are examples respectively of five different line strips as composed in the apparatus shown in Figures 1 to 10.

Figure 29 is an example of a line proof made from the strip shown in Figure 24.

Figure 30 is an example of a page key proof which serves to guide the operator of the apparatus shown in Figures 11 to 23 in composing a corrected page form.

Figure 31 is a diagram of electric circuits.

The part of the apparatus that is controlled by the record-strip and yields the exposed line strip, as shown in Figures 1 to 10, is developed from the apparatus described in the specification of my Patent No. 2,229,689. The record-strip employed to control the operation of the apparatus shown in the present Figures 1 to 10 is of the known kind, prepared for example on the machine described in the specification of Patent No. 944,405, and widely used for controlling single type-casting and composing machines.

The machine that prepares the record-strip is controlled from a key-board, the keys of which through permutation mechanism are coupled to two main groups of punches or perforating devices, and the usual signal for a character or other printing element consists of two components, one made by a punch in each group of punches.

Some of these perforations constitute signals which in a single type-casting and composing machine controlled by the record-strip control gauges with which positioning mechanisms co-operate to move a matrix case, or die case, in two directions to bring a selected character or the like over the mould. One of the components also controls a variable device, or wedge, for determining the extent of the mould opening in accordance with the width of the character selected. The record-strip is also provided with justification perforations—two groups for each line—which position justification wedges in the casting machine, so that the required justification for a line is distributed amongst the interword spaces. This record-strip is passed through the casting machine in a direction reverse to composition, so that the justification mechanism for a line is set before the composition of the line is commenced, but is only brought into operation when an interword space is to be produced. Other signals in the record-strip control the transfer of the space-dimensioning mechanism to the character-dimensioning mechanism, and vice versa. Other signals in the record-strip control mechanism for sending away or removing the composed and justified lines. An example of such a single type machine is described in the specification of Patent No. 625,998.

In the present example certain mechanisms controlled by the record-strip are equivalent to mechanisms in the machine described in the said specification No. 625,998, and as such known mechanisms are widely used, it will be unnecessary to give a detailed description of the corresponding parts of the present apparatus.

In the mechanism shown diagrammatically in Figure 1, the master negative plate 40, which bears characters of 12 point height, is horizontal and generally similar to that described in my said patent specification No. 2,229,689, being mounted and controlled in the same way. A projection lamp, indicated diagrammatically at 41, and also similar to that described in my said specification, co-operates with the master plate 40 to illuminate each character from above as it occupies the projection station 42, indicated by a blacked square on the plate 40. A mechanically operated shutter controlling the character exposures consists of two slides 43 and 44 (Figure 10) having apertures 45 and 46 and constrained to move equally and oppositely by two bell-crank levers 47 and 48 mounted on fixed pivots 49 and 50. The upper two arms of the levers engage a vertically movable pin 51. As shown in Figure 1, the pin 51 is in its highest position, and the apertures 45 and 46 register with each other, their centres being on the optical axis of projection, which passes vertically through the middle of the projection station 42. Lowering of the pin 51 causes the slides 43 and 44 to move oppositely and so take the apertures 45 and 46 out of register with each other. The pin 51 is actuated through a two-armed lever by the means (not shown) that raise and lower the master plate 40.

Below the shutter 43, 44 is an automatic apertured shutter slide 52 for controlling the exposure during the line feed and an auxiliary apertured shutter slide 53 which is hand operated by means of a slidable control knob 54. Below the shutters and on the projection axis is a stationary lens 55 having a fixed focal length of 5.0 cm.

The camera (Figure 2A) includes a rigid case 56 containing a trailing spool 57 and a take-up spool 58 disposed with their axes parallel, horizontal and on opposite sides of the projection axis. The film 59 constituting the line, correction or other strip passes upwards off the trailing spool 57, over two power-driven rollers 60 and 61 also on opposite sides of the lens axis, and down to the take-up spool 58. The rollers 60 and 61 are fitted with short pegs to form sprockets adapted to engage in the perforated holes in the line film 59 which is to S. M. P. E. standard 35 or 60 mm. wide, with perforations at 4.75 mm. pitch. The rays emerging from the lens 55 (Figure 1) pass through a hand-operated shutter co-operating with an elongated aperture 62 the length of which is parallel to the spool and roller axes; the rays thereafter form on the horizontal run of film between the two rollers 60 and 61 a character image of 4 point size.

Details of the camera are shown in Figures 5 to 8. The case consists of a tubular body 56A and back and front end plates 56B and 56C. Studs 73 fast in a carriage to be described hereinafter pass through holes in the back plate 56B and in the front plate 56C, the camera being held in place on the carriage by nuts 74 on the front ends of these studs. The rollers 60 and 61 are rotatable on pins 65 fast in the back plate and engaged in bushes 66 on the front plate. These rollers have sprocket teeth 67 and are rigid with gear wheels 68. (For the sake of clearness, in the part of Figure 8 showing the sprockets, the teeth of the gear wheels 68 are omitted behind the sprockets.) The wheels 68 are in mesh with a wheel 69 fast on an internally splined hollow shaft 70 rotatable in bearings 71 and 72 on the end plates. The spools 57 and 58 are rotatable about the axis of the pins 73 already mentioned, and are mounted in bushes 73A and 73B fast in the front and back plates. Pins 63 fast in the back plate, passing through holes in the front plate, and having reduced front ends screwed for nuts 64, retain the front plate. The trailing spool 57 is fitted with a spring washer 75 which bears on the inner face of the front plate and imposes a frictional drag on the spool. The take-up spool 58 is provided with a slipping drive consisting of a belt pulley 76 connected by a rubber belt 77 to a pulley 78 on the shaft 70. The film is supported during exposure by a bracket 79 fixed to the back plate 56B.

Figure 6:
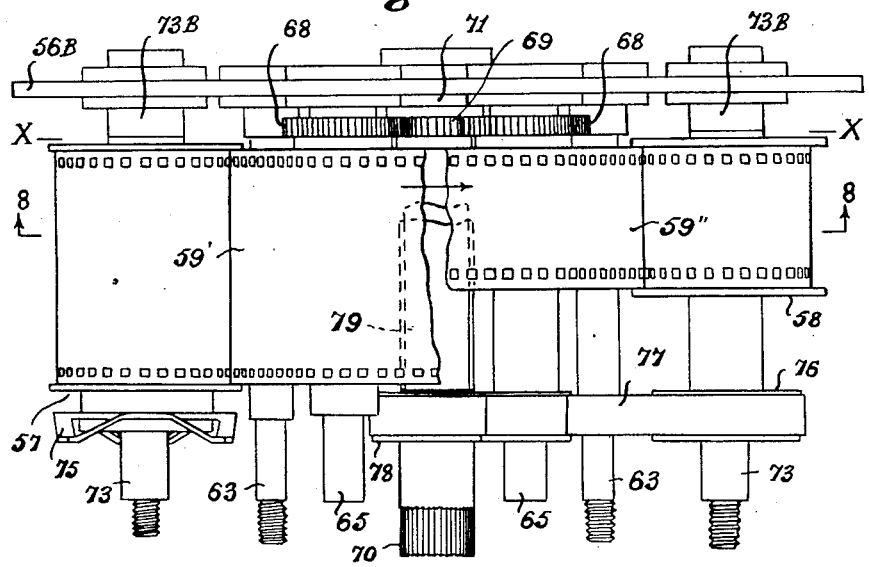
Figure 6 is a plan of the internal parts of this camera.

The camera will take spools for film 35 mm. or 60 mm. in width, as required by the measure of the copy. Figure 6 is a composite view showing a 60 mm. trailing spool and a 35 mm. take-up spool, the films of the two widths being denoted respectively by 59′ and 59″. The camera shutter is a rotary member 80 having a transverse aperture 80′, as indicated in Figures 9 and 10 and in chain-dotted lines in Figure 7; it is controlled by a handle 81 (Figure 5).

It will be apparent that the take-up and trailing spools can be readily transposed, so that the film 59 can be fed in either direction at will. The use of such a reversible camera, in combination with a selection of master plates on which the characters appear either upright, or inverted, or in mirror-copy reversal or both inverted and so reversed, enables the final page image to appear either normal or mirror-copy reversed, according to the printing process to be employed, i. e. direct or offset, and also the printed lines to read from right to left when desired, e. g. when written in Hebrew. Means for reversing the direction of feed are embodied in the mechanism for rotating the shaft 70, to be described later.

The camera carriage 82 (Figures 2A, 9 and 10) is slidable on horizontal guides 289 on a fixed member 290, in a direction parallel to the spool axes, and is fed step by step, in the intervals between exposures, in one direction by means of a toothed sector 302 which is engaged with a rack 83 fixed to the carriage and which is oscillated through a distance determined by the record-strip and dependent on the width of the character last (or next to be) projected.

The driving mechanism shown in Figure 1 includes several parts which are of common design in single type composing and casting machines and which will therefore be only briefly referred to herein. A driving motor 84 is coupled by a belt 85 co-operating with fast and loose pulleys 86 and 87 to a cam-shaft 88A connected by a 1-to-1 gear train 89, 90, 91, to a second cam-shaft 88B parallel with the shaft 88A. These shafts carry cams which operate, under the control of the record-strip, and in a manner which will be made clear by reference to the prior specifications hereinbefore referred to, to move the master plate 40 as necessary to select characters for exposure, to make successive exposures, to feed the camera carriage between exposures through steps corresponding to the width of character last (or next to be) projected, and to operate an automatic line strip on the completion of each line. The various cams operate the following mechanisms: cams CC, transfer wedges; DD, master negative vertical locating mechanism; EE, master negative horizontal positioning mechanism; FF, record-strip feed; GG, character (camera carriage) feed; and I, stop racks. Element H is a reverse rotation stop.

Gear wheel 90, which is of the same diameter as wheels 89 and 91, is fast on a shaft 92 which is connected with a shaft 95 by skew gears 93, 94 yielding a speed reduction of 2 to 1. A two-tooth ratchet wheel 96 is fast on the shaft 95 which is rotatable in a sleeve 97. A disk 98 rigid with the sleeve 97 carries a pawl 99 (Figure 4) biased by a spring 100 which tends to put the hooked nose 101 of the pawl in the path of the teeth of the ratchet wheel 96. A detent lever 102 carried by a fixed pivot 103 is urged by a spring 104 into the path of a tail 105 of the pawl 99 which co-operates with a stop 106 on the disk 98. The detent can be displaced against the force exerted by the spring 104 by either a hand trip 107 or an automatic trip 108. The detent 102, when momentarily tripped, disengages from the tail of the pawl 99 which is consequently engaged by the ratchet wheel 96. The disk 98 and the sleeve 97 are therefore constrained to rotate with the shaft 95 until they have completed a revolution, when the tail of the pawl re-engages the detent so that the pawl is rocked on the disk out of engagement with the ratchet wheel, the disk being positively arrested by engagement of the tail of the pawl against the stop 106.

The parts intermittently driven through this pawl clutch mechanism include a gear wheel 109 fast on the sleeve 97 and driving at 1-to-1 ratio a gear wheel 111 through an idler wheel 110. The wheel 111 is fast on a line cam-shaft 112 having cams 113 and 114. A splined shaft 115 slidably engaged in the internally splined hollow shaft 70 (Figures 5 to 8) of the camera in all positions of the camera is drivably connected to the line cam-shaft 112 by skew gearing 116, 117, a shaft 118, skew gearing 119, 120, a shaft 121, a worm wheel 122 and a worm 123 on the shaft 112, by which mechanism the film is fed on completion of each line. The direction of rotation of the splined shaft 115 is reversed when required to change the direction of film feed, by substituting right and left hand skew gearing 116 and 117. The cam 113 co-operates with a cam-follower 124 kept in contact with the cam by a tension spring 125 and pivotally mounted on a fixed bracket 126. This cam-follower is coupled to the shutter slide 52 by a pin 127. A cam-follower 128 pivotally mounted on a fixed bracket 129 co-operates with the cam 114 and is coupled by a link 130 to a lever 131 pivotally mounted on a fixed bracket 132. The lever 131 has a forked end engaged with an H-shaped member 133, fixed to a camera return tappet 134 which co-operates with the camera carriage 82 (Figures 2A and 2B).

The shaft 92 can be rotated, e. g. for facilitating initial adjustment of the apparatus, by means of a hand wheel 135 adapted to engage the shaft 92 through a jaw clutch 136 controlled by a handle 137.

The upper ends of the continuously rotatable shaft 95 and of the intermittently rotatable shaft 112 are provided with transverse key-ways 138 and 139 of Oldham couplings having respectively driving keys 140 and 141 on two contactor shafts 142 and 143 (Figures 3 and 31). The shaft 142 has two two-lobe cams 144 and 145 operating respectively two pairs of D. C. contacts 146 and 147, and two pairs of A. C. contacts 148 and 149. The shaft 143 has a single-lobe cam 150 and a single-flat cam 151 operating respectively D. C. contacts 152 and 153.

Details of the feed mechanism of the camera carriage are shown in Figures 2B, 9, 10 and 31. An electro-magnet 291 rigid with a stationary member 292 co-operates with an armature 293 rigid with the carriage 82, so that, when this magnet is energised, the camera is held stationary. A bar 294, slidably guided in a fixed part 295, and coupled to the character and space feed mechanism, rigidly carries an electro-magnet 296 which co-operates with an armature 297 fixed to a rack 298, the parts 297 and 298 being also slidably guided in the fixed part 295. A toothed sector 299 engaged with the rack 298 is fixed to a shaft 300 journalled in a fixed bearing 301. A toothed sector 302 fixed to the shaft 300 meshes with the rack 83 on the camera carriage.

Terminals 303 and 304 are connected across a D. C. supply and terminals 305 and 306 across an A. C. supply. A D. C. circuit runs from terminal 303, through conductor 307, contacts 152, conductor 308, contacts 146, and windings 309 of magnet 296 to terminal 304. Another D. C. circuit runs from terminal 303, through conductor 307, contacts 152, conductor 308, contacts 147 and windings 310 of magnet 291 to terminal 304. A signal circuit operative during line change runs from terminal 303, through contacts 153 and lamp 311 to terminal 304. An A. C. circuit runs from terminal 305, through conductor 312, contacts 148 and windings 313 of magnet 296 to terminal 306. Another A. C. circuit runs from terminal 305, through conductor 312, contacts 149 and windings 314 of magnet 291 to terminal 306.

The apparatus which composes the lines into page form may be arranged to project either horizontally or vertically. Figures 11 to 23 show such an apparatus of the horizontal type. It comprises a hollow base 154 (Figure 11) containing driving mechanism, a turret 155 slidable longitudinally on the base, and a dark-slide assembly 156 fixed on the base.

The turret includes a drum 157 (Figures 12A, 13 and 14) integral with two horizontal tubular lugs 158 and 159 slidable on two tubular rails 160 and 161 fixed within the base 154. A rack 162 (Figure 14) fixed to the lug 159 is engaged by a pinion 163 fast on a shaft 164, rotatable in a bearing 165 in the base 154, the shaft being fitted with a handle 166. A horizontal tube 167 (Figures 11, 12A and 13) rigid with the drum 157 is slidable in a lug 168 fixed to the top of the base. The open side of the drum is fitted with a cover 169 (Figure 14) retained by screws such as 170. A bearing tube 171 is fixed coaxially with the drum to a boss 172 on its side wall. A face-plate 173 has a tubular hub 174 rotatable on the bearing tube 171. A capstan 175 having five arms is rotatable on the tube 171 and in a bearing 176 on the cover 169. The capstan is drivably connected to the face-plate hub by two keys 177, fitted to a spigot on the capstan and also fitted in a counter-bore in the face-plate hub.

The face-plate is provided with radial webs 178 which form five pockets (Figure 12A) each containing an optical condenser 179 and a film-feeding device. Each such device, which is generally similar to the film-feeding mechanism of the camera shown in Figures 5 to 8 and which is shown diagrammatically in Figures 12A, 18 and 20, includes a take-up spool 180, a trailing spool 181, and two toothed rollers 182 and 183, all disposed with their axes parallel to the face-plate axis. The film 59 passes outwards from the trailing spool 181 to the toothed roller 183, thence tangentially to the toothed roller 182 and finally inwards to the take-up spool 180. The toothed rollers 182 and 183 are rotatable in bearings 184 and 185 (Figure 20) in the face-plate 173 and are rigid with gear wheels 186 and 187 respectively. These wheels are in mesh with a gear wheel 188 fast on a shaft 189 journalled in a bearing 190 (Figures 14 and 15) in the face-plate 173. In the diagrammatic Figure 20 these gear wheels are, for the sake of clearness, shown on the opposite side of the face-plate to the feed rollers. It will be seen, however, from Figures 14 and 15 that the gear wheels and feed rollers are in practice on the same side of the face-plate. The shaft 189 terminates in a male jaw-clutch member 191.

A female jaw-clutch member 192 (Figure 15) is slidably splined on a shaft 193 rotatable in bearings 194 and 195 respectively in the drum 157 and in a gear case 196. A skew gear wheel 197 fast on the shaft 193 meshes with a skew gear wheel 198 fast on a vertical shaft 199. A bracket 200 (Figure 14) fixed to the bottom of the drum 157 supports the lower end of the shaft 199 to which is fixed a skew gear wheel 201 meshing with a wheel 202. The hub of the wheel 202 is journalled in the bracket 200 and is internally splined and slidably engaged with a splined portion of a shaft 203 rotatable in bearings 204 and 205 (Figure 12B) in the base 154.

The shaft 193 is so located in the drum as to be engageable with the one of the five film feed mechanisms that is at any time in the projection station. A shaft 193A, on which is slidably splined a female jaw-clutch member 192A, is located in the drum at a position such that it can be engaged with the one of the five film feed mechanisms that is at any time in the viewing station. The shaft 193A is associated with a driving gear mechanism similar to part of the mechanism for driving the shaft 193 and denoted by the same reference numerals, with the suffix "A." The shaft 199A terminates in a knob 206 by means of which it can be rotated by hand in either direction.

The female clutch members 192 and 192A (Figure 17) are shifted axially in unison by a striking plate 207 urged in the engaging direction by a compression spring 208. A headed disengaging bolt 209 passes through the plate 207 and is slidable in a guide 210 in the drum 157. A lever 211 is pivotally mounted on a bracket 212 (Figures 13 and 16) fixed to the drum 157, and the end of the lever 211 is coupled by a pin 213 to the tail of the bolt 209. A handle 214 is fixed to the lever 211. This clutch control mechanism can be retained in the disengaging position, in which it appears in Figures 13, 16 and 17, by means of resilient ball plungers 215 carried by a forked bracket 216 and co-operating with dimples on the lever 211.

A line counter 217 (Figures 11, 13 and 15) is driven through a shaft 218 and skew gearing 219, 220 from the shaft 199.

Means for locking the drum on the base consist of a plunger 221 (Figure 14) slidable in a transverse bore in the lug 158 into frictional engagement with the rail 160 under control of a wheel nut 222 engaged on a screw-threaded part of the plunger.

A spring-loaded bolt 223 (Figure 12A) for locating the face-plate 173 in various index positions is slidably mounted in the drum 157 and has a taper nose adapted to engage in any of ten indexing holes 224 uniformly distributed around the face-plate. Five of these locations enable any of five films to be set in the projecting station or the viewing station, and the other five are intermediate blank locations.

The viewing means (Figures 12A, 18 and 20) include a hood 225 on the drum 157 and containing a ground glass screen 226 and a reflector 227. A lens 228, which may be fitted between the reflector and the film, as shown in Figure 12A, or between the screen and the reflector, as shown in Figures 18 and 20, forms on the screen an image of the part of the film in the viewing station.

The projection lamp 228 (Figures 18, 19 and 20) is mounted inside the turret bearing tube 171 which has ports 229 and 230 for the passage of light rays towards respectively the projecting station and the viewing station. The hub of the face-plate 173 has five ports 231, two of which register with the ports 229 and 230 when the face-plate is indexed to bring any film into the projection station.

A mount 232 carrying a lens 232' (Figures 11 and 12A) is slidable on two horizontal tubular rails 233 and 234 fixed to the turret drum 157. A pinion 235 in the lens mount 232 and controlled by a hand wheel 236 meshes with rack teeth 237 cut in the rail 234 for adjusting the position of the lens mount, and a locking bolt 238 slidable in a bore in the lens mount can be frictionally engaged with the rail 233 by a hand nut 239. The lens mount 232 is connected to the drum 157 by a telescopic tube assembly 240, and an optical stop 241, having a horizontally elongated aperture corresponding in depth to the point size of the character images on the line film, defines the projection station.

The dark-slide assembly 156 (Figures 11 and 12B) comprises a bracket 242 fixed to the top of the base 154 and having a vertical face 243 against which a dark slide carrier 244 is fitted for vertical sliding between lateral guides such as 245. The bracket 242 is connected to the lens mount 232 by a telescopic tube assembly 246. A light-sensitive film on which a page of justified lines of text matter is to be composed to form a transparency after processing, is contained in a dark slide 247 which is held against the holder 244 by bow springs such as 248.

The bracket 242 has a horizontally elongated aperture 249 which defines the exposure station and in front of which is a shutter having two co-operating apertured slides 250 and 251. A lug 252 fixed to the slide 250 passes through a vertical slot 253 in the slide 251 and is connected by a rod 254 to a tappet 255 actuated by a link 256. A lug 257 on the slide 251 is connected to a rod 258 which co-operates with a friction brake 259. A part of the lug 257 is engaged in a vertical slot 260 in the slide 250. The operation of this shutter will be described with reference to the diagrammatic Figures 21 and 22A–22E. In Figures 21 and 22A the shutter is closed and in its normal rest position, the pencil of light rays 315 passing from the lens 232' towards the film in the direction of the aperture 316 of the slide 251 and being stopped by the slide 250. As the rod 254 is raised, the aperture 317 of the slide 250 is brought into register with the aperture 316; Figure 22B shows the shutter fully open. With continued rising of the rod 254, the lug 252, which now abuts against the upper end of the slot 253, causes the slide 251 to rise also. When the slides reach their highest position (Figure 22C) the shutter is closed again. The cam 280 (Figure 23) is designed to give the rod 254 a substantially constant speed in its upward movement, so that the exposure time is constant at all points in the height of the exposure field. When the rod 254, which is biased by a spring 256' (Figure 23) in the operating mechanism, descends, first the slide 250 falls until the lug 252 reaches the bottom of the slot 253. Since the apertures 316 and 317 are now out of register, the shutter remains closed (Figure 22D). The slide 251 is thereafter drawn down with the slide 250 until the two slides regain their original or normal rest position (Figure 22E, which is identical with Figure 22A).

To the dark-slide carrier 244 is detachably fixed a stirrup 261 (Figures 12B and 23) which embodies a nut 262 engaged with a multi-start lead screw 263 drivably connected by a quick release coupling 264 to a shaft 265 journalled in the base 154. This arrangement enables the velocity ratio of the drive to the dark-slide carrier to be easily varied by changing the lead screw and the nut. To the lower end of the shaft 265 is keyed a skew gear wheel 266 meshing with a skew gear wheel 267 fast on a shaft 268 fitted with a handle 269. The shaft 268 is coaxial with the shaft 203 and is normally driven from the shaft 203 by a jaw clutch 270 which is controlled through a shaft 271 and a lever 272. A spring 273 (Figure 12B) biases this clutch towards engagement.

A motor-driven shaft 274 (Figure 23) is connected by speed-reducing belt gearing 275 and worm gearing 276 to a shaft 277 which can thus be driven continuously at 15 R. P. M. This shaft is rotatable in a hollow shaft 278 which is rigid with a driven member of a trip clutch 279, the cam 280 and the driving member 281 of a Geneva mechanism, the driven member 282 of which is fast on the shaft 203. The trip clutch 279 is similar in principle to that described with reference to Figure 4 and is therefore not shown in detail in Figure 23. Its driving member is a one-tooth ratchet element 283 fast on the shaft 277. This clutch is tripped into and out of engagement by a handle 284.

A skew gear wheel 285 meshing with the intermittently driven wheel 267 may be employed to drive a proofing attachment, substituted for the dark-slide assembly 156, and comprising an arrangement similar to the film-feeding devices in the turret, but used for feeding a continuous strip of light-sensitised paper on which galley proofs of the line film can be printed.

The operation of the apparatus according to this invention will be described by outlining the procedure necessary in photo-composing a novel.

The first step is to prepare from the perforated record-strip, by the line-composing machine shown in Figure 1, a film or a succession of films bearing images of characters arranged in justified lines and representing only the text proper. A part of such a film is denoted by 59A in Figure 24, the lines of text being indicated by the rectangles 286. Immediately before any line is begun, the camera will be at the right hand end of its range of travel (Figures 1, 2A and 2B) and the trip clutch (Figure 4) will be disengaged. Characters are now composed on the film one at a time by optical projection from the master plate to form a justified line; the positioning of this plate, the operation of the shutters 43, 44, and the step-by-step advance of the camera carriage 82 from right to left through a distance depending on the width of the character last projected, are effected by the mechanism actuated by the cam shafts 88A and 88B under control of the record-strip. The bar 294 (Figures 9, 10 and 2B) is advanced, subsequent to the projection of each character, through a distance proportional to the space occupied by the character, and thereafter retracted to a constant rest position. Before the bar 294 moves forward, cam 144 (Figures 3 and 31) closes contacts 146 and causes the feed magnet 296 to be energised (contacts 152 being continuously closed until the end of a line is reached). Cam 145 momentarily closes contacts 149 so that a demagnetising A. C. pulse is fed to the stop magnet 291. The bar 294 now advances, and since the armature 297 is magnetically locked to the feed magnet 296, the sectors 299 and 302 are moved by the rack 298 and feed the carriage 82 forwards through a distance proportional to the displacement of the bar 294. Now cam 144 closes contacts 147 and causes the stop magnet 291 to be energised so that the carriage 82 is magnetically locked in position; and cam 145 momentarily closes contacts 148 so that a demagnetising A. C. pulse is fed to the feed magnet 296. The bar 294 is now retracted. The individual feed displacements of the bar 294 are thus integrated at the camera carriage 82. The spacing of the characters along a line on the film can be varied, if desired, by substituting for the sectors 299 and 302 alternative sectors having a different ratio of radii, the bearing 301 being raised or lowered as necessary.

As soon as a line has been composed, appropriate perforations on the record-strip cause the trip clutch to be automatically engaged and kept engaged while the cam shafts 88A and 88B make two complete revolutions, and the sleeve 97 and the shaft 112 make one complete revolution. While the trip clutch is engaged, the cam 113 keeps the shutter 52 closed, the contacts 152 open to interrupt the D. C. supply to both the feed and stop electro-magnets 296 and 291 of the driving mechanism of the camera carriage 82, so that the carriage is free to move, and the contacts 153 close to energise the signal lamp 311. The cam 114 now actuates the follower 128 and moves the carriage to the right so far that the projection axis is aligned with the beginnings of the lines. At the same time the gear transmission 116—123 causes the splined shaft 115 to rotate so far that the film is fed in the camera through a distance equal to the perforation pitch, i. e. 4.75 mm. By the time the trip clutch has disengaged again, the contacts 152 have reclosed, the shutter 52 has re-opened, and the camera-return tappet 134 has parted from the carriage 82 so that the carriage 82 can be fed as required for the composition of the next line.

A line proof (Figure 29) of the film 59A is now printed to an enlarged scale on light-sensitive paper, such as standard document paper 5½ in. wide and perforated along one edge. This proof may be made on the apparatus shown in Figures 11 to 23, with the aid of the proofing attachment hereinbefore referred to, or on a separate machine, and corresponds to the ordinary galley slips; it may be made in any desired length. The line proof is marked with corrections by the reader or author, and faulty lines are retapped, in the order in which they appear in the text, at the key-board of the machine that makes the record-strip. If corrections necessitate overruns, the replacement lines are also retapped at the same time. The record-strip for the corrected lines is employed in the apparatus shown in Figures 1 to 10 to compose a correction film, denoted by 59B in Figure 25, and in which all altered lines appear in uninterrupted succession.

The films 59A and 59B carry only the text proper and corrections to this text. Other elements that are required to make up the copy are projected similarly onto other films. For example, a film 59C (Figure 26) is used for chapter headlines and numbers, symbols for signatures, oddments such as special folios, lines of poetry in a different point size, and second corrections, arranged in the order in which they will appear in the finished book; films 59D (Figure 27) and 59E (Figure 28) carry respectively left-hand page headlines including even page numbers, and right-hand page headlines including odd page numbers, arranged in order.

Proofs of all the films 59B to 59E are now made, similarly to the line proof, and a key proof of each page of the book is made by cutting the several proofs of the films and patching them onto page key proof blank forms. An example of such a page key proof is shown in Figure 30. Between the perforations and the left-hand margin is a column of line numbers. Immediately to the right of the perforations is a code column, marked with different colours or symbols in order to denote the film on which the adjacent line is to be found. Between the code column and the right-hand margin is the text matter. The symbols shown in the code column in Figure 30 have the following meanings: S, space line (blank); and A, B, C and D, lines from films 59A, 59B, 59C and 59D respectively.

The films 59A to 59E are now loaded into the five film-feeding devices of the turret 155 of the make-up machine (Figures 11 and 12A) and set so that the first line of matter on each is in position for projection. The turret and the lens mount 232 are shifted longitudinally to positions of adjustment that will yield the desired point size of characters. In the example shown the point size of the page transparency can be varied from 5 to 14. Rapid and precise adjustment is facilitated by channel-section spacers of different lengths, such as 287 and 288, which are slipped over the rails 233 and 167 (Figures 11 and 12A). The dark-slide assembly is fitted with a lead screw 263 and nut 262 having the pitch necessary to give the desired line interval on the final page.

A slide carrying a light-sensitive film is placed on the dark-slide holder which is set by means of the handle 269 to the bottom of its range of movement, the clutch 270 being disengaged by the handle 272 during this initial setting. The face-plate being in one of the five space or blank indexing positions, in which no film is in position for projection, the counter 217 is reset to zero and the trip clutch 279 (Figure 23) is engaged by the handle 284 and disengaged after two revolutions. As a result, the shutter 250, 251 is opened twice and the shaft 203 is stepped round two quarter revolutions. However, since no light can reach the lens 232' from the turret while in a blank index position, there is no exposure of the page form. The rotation of the shaft 203 causes the dark-slide holder to be raised through a height equal to two line intervals, so that line 3 of the light-sensitive film in the slide occupies the exposure station. This preliminary procedure ensures that all backlash in the gearing is taken up.

Next the face-plate is rotated by the capstan 175 to bring the appropriate film, e. g. 59D (if page 196, the key proof of which appears in Figure 30, is being composed) to the viewing station, with respect to which it is accurately located by the spring-loaded bolt 223, and the operator checks that the proper line is in place ready to be transferred to the projection station. If it is not in place, he operates the handle 214 to engage the feed clutches and corrects the position of the film 59D by means of the handle 206. Since the angular pitch of the teeth of these clutches is made equal to, or an integral sub-multiple of, the angle through which they rotate in feeding the film through one line interval, once the films have been initially positioned the clutches will always re-engage cleanly, i. e. without the necessity for relative rotation of their elements; and the films will therefore always rest in positions such that a line is exactly on the axis of the associated condenser 179. The turret is now indexed round to bring the film 59D into the projection station, the film feeding clutches are engaged by means of the handle 214, and the trip handle 284 is operated to engage the trip clutch 279 for one revolution. The shutter is opened by the cam 280, and as soon as it has reclosed, the Geneva mechanism 281, 282 advances the shaft 203 one quarter turn so that the dark-slide carrier is raised to bring line 4 of the light-sensitive film in the slide to the exposure station and the film 59D is fed through one line interval. The turret is now indexed to a blank position, and the trip clutch is engaged for 1 revolution to feed the dark-slide carrier and thus bring line 5 of the light-sensitive film in the slide to the exposure station. The turret is next indexed to bring film 59A first to the viewing station and then to the exposure station, the film feeding clutches are re-engaged, and the trip clutch is kept engaged while the machine projects in succession lines 5 to 8 from film 59A to the page form. Since lines 9 and 10 are corrected text, the operator stops the machine, in accordance with the code B indications on the page key proof (Figure 30) disengages the film feeding clutches, and indexes the turret so as to bring the correction film 59B first to the viewing station and then to the projection station. The film feeding clutches being re-engaged, the trip clutch is kept engaged for two revolutions so that lines 9 and 10 of the page form are projected from the correction strip. Next the film feeding clutches are disengaged, the turret is indexed to bring film 59A to the viewing station and the film feeding clutches are reengaged. Handle 206 is operated to feed film 59A through two line intervals, so that the faulty and therefore unwanted lines 9 and 10 on it are by-passed, and line 11 being suitably viewed and checked, the film feeding clutches are disengaged, the turret is indexed to bring the film 59A to the projection station, these clutches are re-engaged, and the trip clutch is re-engaged and kept engaged while the machine projects in succession lines 11 to 20 from film 59A to the page form. A like procedure is followed until the page is completed.

The machine is easy to operate, since the counter 217 at any time tells the operator the number of the line next to be projected, the page key proof, which may be hung on the viewing hood underneath its mouth, tells him which film is to be used, and the viewing station enables him to check that the correct line of the film has been selected for exposure. The code column of the key proof may conveniently be marked with five different code colours, the appropriate five knobs of the capstan being correspondingly coloured.

I claim:

1. Apparatus for photographically composing a page form from at least two films perforated for feeding in known manner and each bearing character images arranged in justified lines disposed transversely of the film, by selecting single lines or groups of lines in turn from the several films, the apparatus including an indexing head, at least two film feeding devices distributed around said head, each of said devices including at least one feed sprocket associated with a driven coupling member and mountings for a take-up spool and a trailing spool, an optical system defining a projection station and an exposure station and including exposing means for projecting an image of a line of characters from said projection station to said exposure station, a viewing station at one portion of said head, feed-clutch means at said viewing station for positioning a film showing thereat, control means operable for angularly displacing said indexing head so as to bring any of said films into said projection station and another of said films at the same time into said viewing station, a photosensitive page carrier, feeding means for advancing said page carrier past said exposure station, a first driving coupling member positioned to engage the driven coupling member of any of said devices when in said projection station, a power driven member associated with step-by-step driving means operatively connected with said driving coupling member and said page-carrier feeding means, and a second driving coupling member operable at will and positioned to engage the driven coupling member of any of said devices when in said viewing station.

2. Apparatus for photographically composing a form comprising justified lines of corrected text arranged in a column, from at least two line strips each bearing characters arranged in justified lines at uniform intervals, the apparatus including feeding means capable of feeding the line strips independently of each other and in uniform steps corresponding to the line intervals thereon so as to bring the lines of text matter on each strip in succession to a projection position, an optical projection system for projecting an image of a single line of text matter occupying any of said projection positions onto a common area, an exposure station defining said area, a holder for so holding a light-sensitive element that the required position of a line of text matter on the light-sensitive element registers with said exposure station, control means for selecting any one of said strips for such projection of lines therefrom, holder feeding means for effecting between successive exposures relative movement of said holder and said exposure station perpendicularly to the length of the line images, a power driven member associated with step-by-step driving mechanism, a driving connection between said mechanism and the one of said strip feeding means that is associated with the strip selected at any time for projection, a driving connection between said mechanism and said holder feeding means, said holder feeding means having changeable velocity ratio determining parts, and auxiliary driving means operable at will for actuating said holder feeding means independently of said one strip feeding means and through a distance which is variable at will.

3. Apparatus as claimed in claim 2, wherein the driving connection between said step-by-step driving mechanism and said holder feeding means includes a clutch, and said auxiliary driving means engages the last-mentioned driving connection between said clutch and said holder feeding means.

4. Apparatus for photographically composing a form comprising lines of corrected text arranged in a column, from at least two films perforated for feeding by means of sprockets and each bearing lines of text matter disposed at uniform intervals, the apparatus including a support, a plurality of film-feeding devices mounted on said support and each including at least one feed sprocket and mountings for a take-up spool and a trailing spool, each of said devices being operable to bring the lines on a film therein in succession into a projection position, an optical projection system for projecting an image of a single line of text matter occupying any of said projection positions onto a common area, an exposure station defining said area, a holder for so holding a light-sensitive element that the required position of a line of text matter on the image-carrier registers with said exposure station, control means for selecting any one of said films for such projection of lines therefrom, holder feeding means for effecting between successive exposures relative movement of said holder and said exposure station perpendicularly to the length of the line images, and means for operating in timed relation with said holder feeding means the one of said film-feeding devices that carries the film selected at any time for projection, said support having the form of an indexing head around which said film feeding devices are distributed and the apparatus including means defining a common projection station, and selecting control means operable for rotating said head so as to register said projection positions one at a time with said projection station.

5. Apparatus for photographically composing a page form from at least two image-carrier strips each bearing characters arranged in justified lines disposed transversely of the strip, by selecting single lines or successions of lines in turn from the several strips, the apparatus including at least two strip-feeding devices operable independently of each other for advancing the several strips intermittently and line by line, a photo-sensitive page carrier, feeding means operable for advancing said page carrier intermittently through uniform but variable steps, an optical system including exposing means for projecting an image of a line of characters on any of said strips onto the page carrier, and control means operable for selecting any one of said strips for such projection of lines thereon, also including a power driven member associated with a step-by-step driving mechanism, a driving connection between said mechanism and one of said strip feeding devices, a driving connection between said mechanism and said page-carrier feeding means which are capable of having their velocity ratio varied, and auxiliary driving means operable at will for actuating said page-carrier feeding means independently of said one strip feeding device and through a distance which is variable at will, the driving connection between the step-by-step driving mechanism and the page-carrier feeding means including a clutch and alternatively operable gear transmission elements, and the auxiliary driving means engaging said driving connection between said clutch and the page-carrier feeding means.

GEORGE WESTOVER.

REFERENCES CITED

The following references are of record in the file of this patent:

UNITED STATES PATENTS

| Number | Name | Date |
|---|---|---|
| 369,997 | Simon | Sept. 13, 1887 |
| 1,732,049 | Hunter | Oct. 15, 1929 |
| 1,745,956 | Schlesinger | Feb. 4, 1930 |
| 1,893,439 | Ogden | Jan. 3, 1933 |
| 2,160,277 | Neidich | May 30, 1939 |
| 2,172,330 | Bryce | Sept. 5, 1939 |
| 2,227,612 | Westover | Jan. 7, 1941 |
| 2,229,690 | Westover | Jan. 28, 1941 |
| 2,355,268 | Bryce | Aug. 8, 1944 |
| 2,356,620 | Schade | Aug. 28, 1944 |
| 2,388,961 | Elliott et al. | Nov. 13, 1945 |
| 2,475,497 | Harrold et al. | July 5, 1949 |